United States Patent
Yoon et al.

(10) Patent No.: US 10,746,878 B2
(45) Date of Patent: Aug. 18, 2020

(54) METHOD OF MEASURING DISTANCE BY USING 3D DEPTH SENSOR INCLUDING OPTICAL SHUTTER

(71) Applicant: SAMSUNG ELECTRONICS CO., LTD., Suwon-si (KR)

(72) Inventors: Heesun Yoon, Seoul (KR); Jangwoo You, Seoul (KR); Yonghwa Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1018 days.

(21) Appl. No.: 15/076,947

(22) Filed: Mar. 22, 2016

(65) Prior Publication Data

US 2017/0115394 A1  Apr. 27, 2017

(30) Foreign Application Priority Data

Oct. 27, 2015 (KR) .................. 10-2015-0149725

(51) Int. Cl.
*G01C 3/08* (2006.01)
*G01S 17/89* (2020.01)
*G01S 17/32* (2020.01)

(52) U.S. Cl.
CPC .............. *G01S 17/89* (2013.01); *G01S 17/32* (2013.01)

(58) Field of Classification Search
CPC .................................. G01S 17/89; G01S 17/32
See application file for complete search history.

(56) References Cited

U.S. PATENT DOCUMENTS

| | | | |
|---|---|---|---|
| 5,402,234 A * | 3/1995 | Deck ...................... | G01B 9/04 356/497 |
| 6,002,423 A * | 12/1999 | Rappaport .............. | G01S 17/89 348/42 |
| 7,936,449 B1 | 5/2011 | Bamji et al. | |
| 2005/0018209 A1 | 1/2005 | Lemelin et al. | |
| 2007/0153259 A1 | 7/2007 | Eiselt | |
| 2007/0211258 A1 | 9/2007 | Lee et al. | |
| 2008/0007709 A1 | 1/2008 | Bamji et al. | |
| 2008/0316862 A1 | 12/2008 | Bernecky et al. | |
| 2009/0002265 A1* | 1/2009 | Kitaoka ................. | G09G 3/003 345/4 |
| 2009/0115995 A1 | 5/2009 | Bamji et al. | |
| 2009/0153141 A1 | 6/2009 | Mercer | |
| 2010/0141956 A1 | 6/2010 | Leitgeb et al. | |

(Continued)

FOREIGN PATENT DOCUMENTS

| | | |
|---|---|---|
| KR | 10-2014-0071201 A | 6/2014 |
| KR | 10-2014-0102820 A | 8/2014 |
| KR | 10-2015-0054568 A | 5/2015 |

*Primary Examiner* — Samantha K Abraham
(74) *Attorney, Agent, or Firm* — Sughrue Mion, PLLC (57) ABSTRACT

A method of measuring a distance by using a 3-dimensional (3D) depth sensor is provided. The method may include: measuring m number of frames using light modulated at a first frequency to determine a first tentative distance from a viewpoint to an object at the first frequency, m being a positive integer; measuring n number of frames using light modulated at a second frequency to determine a second tentative distance from the viewpoint to the object at the second frequency, n being a positive integer, a sum of m and n being four; and determining a resulting distance to the object based on the first distance and the second distance.

8 Claims, 4 Drawing Sheets

(56) References Cited

U.S. PATENT DOCUMENTS

| | | |
|---|---|---|
| 2012/0062867 A1 | 3/2012 | Shibatani |
| 2012/0188555 A1 | 7/2012 | Izatt et al. |
| 2012/0292481 A1* | 11/2012 | Hutchin ............. F41H 13/0062 |
| | | 250/201.9 |
| 2014/0168369 A1* | 6/2014 | Crane ................... G01S 17/36 |
| | | 348/46 |
| 2014/0300701 A1* | 10/2014 | Park ....................... G01S 17/36 |
| | | 348/46 |
| 2015/0130904 A1 | 5/2015 | Bae et al. |
| 2015/0355332 A1 | 12/2015 | Jeong et al. |
| 2015/0357357 A1* | 12/2015 | Sargent ................. H04N 5/378 |
| | | 250/208.1 |
| 2015/0357360 A1* | 12/2015 | Tian ................. H01L 27/14605 |
| | | 250/208.2 |
| 2015/0358567 A1* | 12/2015 | Sargent ............. H01L 27/14625 |
| | | 348/164 |

* cited by examiner

METHOD OF MEASURING DISTANCE BY USING 3D DEPTH SENSOR INCLUDING OPTICAL SHUTTER

CROSS-REFERENCE TO RELATED APPLICATION

This application claims priority from Korean Patent Application No. 10-2015-0149725, filed on Oct. 27, 2015, in the Korean Intellectual Property Office, the disclosure of which is incorporated herein in by reference its entirety.

BACKGROUND

1. Field

Apparatuses and methods consistent with exemplary embodiments relate to measuring a distance by using an optical shutter, and more particularly, to measuring a distance by using a 3-dimensional (3D) depth sensor including an optical shutter.

2. Description of the Related Art

A 3-dimensional (3D) depth sensor that includes an optical shutter or a depth camera is a sensor using a time of flight (TOF) method. The 3D depth sensor measures a distance to an object by measuring a time for light that is emitted from a light source and is reflected by the object to return thereto. The 3D depth sensor may be used as a motion capture sensor in various user interfaces. Also, the 3D depth sensor may be used for measuring distances and detecting various 3D shapes. For example, the 3D depth sensor may be used as a camera for detecting depth information in industrial fields and as a range sensor in military laser radar or robotic navigation.

SUMMARY

One or more exemplary embodiments provide methods of measuring a distance by using a 3-dimensional (3D) depth sensor to increase measuring distances and accuracy of distance measurement.

According to an example embodiment, there is provided a method of measuring a distance by using a 3D depth sensor including measuring m number of frames using light modulated at a first frequency to determine a first tentative distance from a viewpoint to an object at the first frequency; measuring n number of frames using light modulated at a second frequency to determine a second tentative distance from the viewpoint to the object at the second frequency; and determining a resulting distance to the object based on the first distance and the second distance. m and n may be positive integers, and a sum of m and n may be four.

The measuring the first distance may include: measuring a first phase with respect to the first frequency; and determining the first distance based on the first phase.

The measuring of the second distance may include: measuring a second phase with respect to the second frequency; and determining the second distance based on the second phase.

An A value and a B value of an image signal integrated at the depth sensor are determined based on the following equations:

$$I_1 = A \cos \varphi_1 + B$$

$$I_2 = \alpha A \cos \varphi_2 + \beta B$$

$I_1$ denotes a frame of the m number of frames, $I_2$ denotes a frame of the n number of frames, $\varphi_1$ denotes the first phase, and $\varphi_2$ denotes the second phase. An amplitude and an offset of a drive signal to drive an optical shutter may be controlled to set $\alpha$ and $\beta$ to be 1.

m may be one, two, or three.

N may be one, two, or three.

The method may further include measuring k number of frames to determine a third tentative distance to the object at the third frequency, wherein the determining the resulting distance comprises determining the resulting distance based on the first tentative distance, the second tentative distance, and the third tentative distance, and wherein k, n, and m are two, respectively.

According to an aspect of another exemplary embodiment, there is provided a non-transitory computer readable storage medium storing a program that is executable by a computer to perform a method, the method including: measuring m number of frames using light modulated at a first frequency to determine a first tentative distance from a viewpoint to an object at the first frequency; measuring n number of frames using light modulated at a second frequency to determine a second tentative distance from the viewpoint to the object at the second frequency; and determining a resulting distance to the object based on the first distance and the second distance. m and n may be positive integers, and a sum of m and n may be four.

BRIEF DESCRIPTION OF THE DRAWINGS

The above and/or other aspects will be more apparent by describing certain exemplary embodiments, with reference to the accompanying drawings, in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Figure 1:
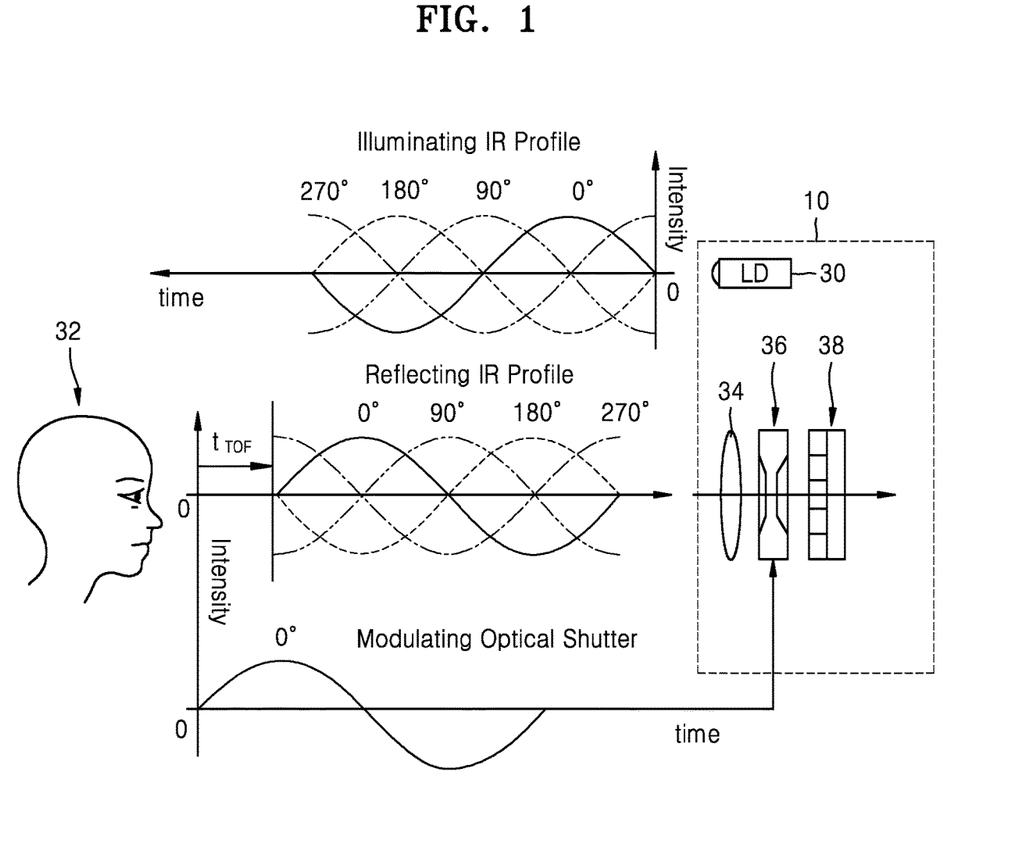
FIG. 1 is a cross-sectional view showing a configuration of a 3-dimensional (3D) depth sensor including an optical shutter and a phase of a frequency used for driving the 3D depth sensor, according to an exemplary embodiment.

As depicted in FIG. 1, a depth sensor 10 that is used for measuring a distance may include a light source 30, a lens 34, an optical shutter 36, and an image sensor 38. The depth sensor 10 may further include a processor that calculates a phase of measured light and a display that visually provides distance information based on the calculated phase. The lens 34 focuses light reflected off the object 32. Light that has passed through the lens 34 is transmitted to the image sensor 38 through the optical shutter 36. The light source 30 may be, for example, a light source that emits infra-red rays, but is not limited thereto. The image sensor 38 may be, for example, a complementary metal oxide semiconductor (CMOS), but is not limited thereto. Light emitted from the light source 30 may be modulated by using a given frequency, and the optical shutter 36 may be driven by a frequency that is the same as the given frequency.

When one frequency is used for modulation of light emitted from the light source 30 and used for driving the optical shutter 36, a maximum distance to be measured by using the depth sensor 10 may be determined according to the frequency.

For example, when the frequency is 20 MHz, the maximum measurable distance may be limited to 7,500 mm. When a measuring distance exceeds this limit, it may be difficult to distinguish a distance to an object within one cycle or beyond one cycle, due to cycle ambiguity. Also, a driving frequency may be increased to enhance an accuracy of distance measurement, but the measurable distance may be reduced.

In order to address this problem, a driving method in which three frequencies are used has been proposed. However, in this case, in order to perform a single update of distance information with respect to an object, three frames per frequency are measured. As a result, 9 frames of data are measured for a single update.

However, in this driving method, although the measurable distance and the accuracy of distance measurement may be increased since a plurality of frequencies are used, 9 frame measurements are required for a single update of the distance information.

In a driving method in which a single frequency is used, distance information may be updated by measuring only four frames. Therefore, the driving method in which three frames per single frequency are measured may have a problem in that the time taken to update the distance information may be longer than that of the driving method in which a single frequency is used.

A distance measuring method according to an exemplary embodiment may use two frequencies, and the number of frames to be measured for updating distance information may be less than or equal to four frames. Accordingly, the distance measuring method according to an exemplary embodiment may maintain the time for updating the distance information to be equal to the case when a single frequency is used while increasing the measuring distance and the accuracy of distance measurement.

Also, a distance measuring method according to an exemplary embodiment may use more than three frequencies. In this case, two frames per frequency are measured. Accordingly, in the case of the distance measuring method according to an exemplary embodiment, the total number of frames may be reduced compared to the driving method in which three frames per single frequency are measured.

Hereinafter, a method of measuring a distance by using a three-dimensional (3D) depth sensor including an optical shutter, according to an exemplary embodiment will be described in detail with reference to the accompanying drawings. In the drawings, thicknesses of layers or regions may be exaggerated for clarity of the specification.

Figure 2:
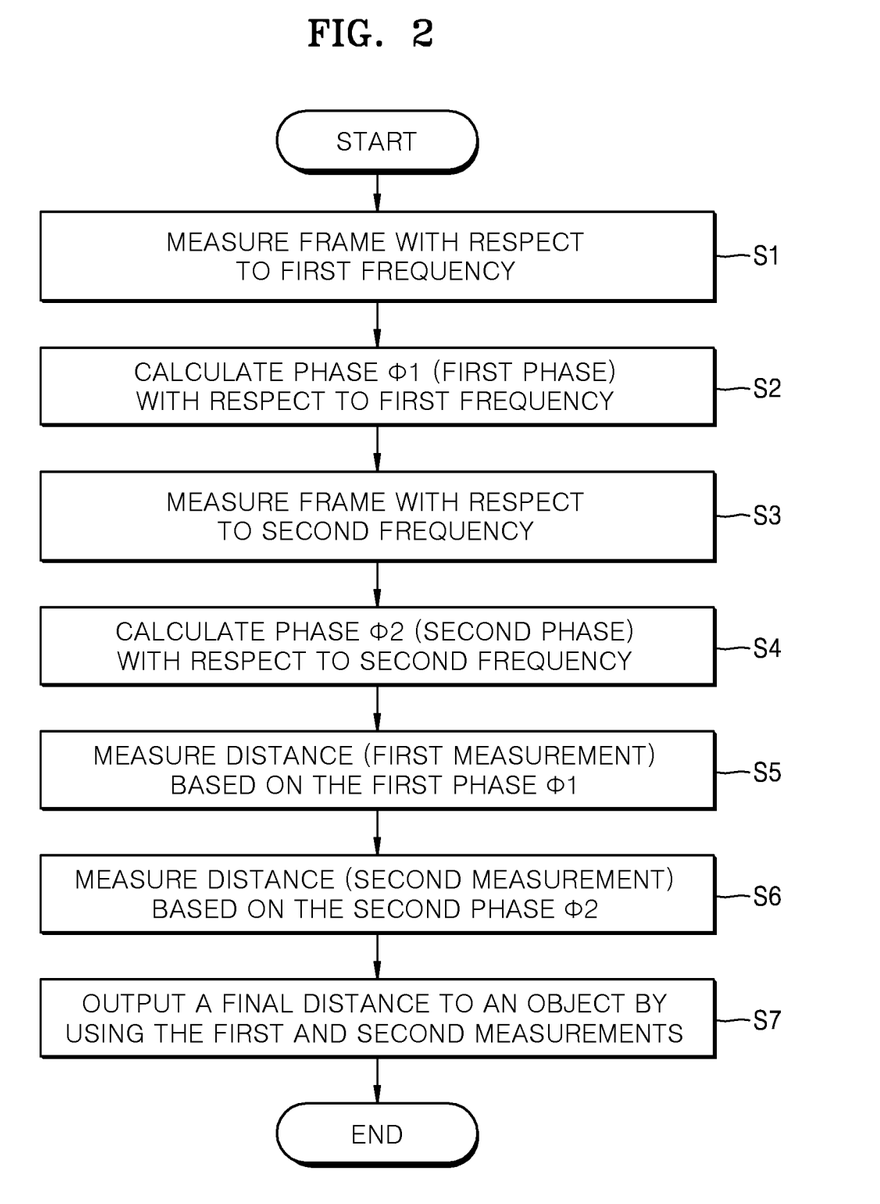
FIG. 2 is a flowchart of a method of measuring a distance by using the 3D depth sensor, according to an exemplary embodiment.

FIG. 2 is a flowchart of a method of measuring a distance by using the 3D depth sensor according to an exemplary embodiment.

Referring to FIG. 2, a frame with respect to a first frequency may be measured in operation S1.

Light modulated by using the first frequency is emitted from the light source 30, and afterwards, the light enters the image sensor 38 through the lens 34 and the optical shutter 36 after being reflected off the object 32. An intensity of the light incident to the image sensor 38 may be measured in operation S1.

The number of frame measurements with respect to the first frequency may be from one to three. However, if three frequencies are used to measure a distance, the number of frame measurements with respect to the first frequency may be two.

When the frame measurements with respect to the first frequency are performed two times, light that is measured at the first measurement may be the light emitted at a phase 0° in FIG. 1. Also, light that is measured at the second measurement may be the light emitted at a phase 90° in FIG. 1. When the frame measurements with respect to the first frequency are performed three times, light that is measured at the third measurement may be the light emitted at a phase 180° in FIG. 1. In the process of frame measurements, a frequency equal to the first frequency may be applied to the optical shutter 36 as a driving frequency. At this point, there may be a phase difference of 90° or more between a driving frequency applied to the optical shutter 36 and a driving frequency applied to the light source 30.

In operation S2, a first phase $\varphi_1$ with respect to the first frequency may be calculated.

The operation S2 is a process of measuring a phase (the first phase $\varphi_1$) of light incident to the optical shutter 36 when the light modulated by the first frequency is reflected off the object 32 and enters the optical shutter 36, which will be described below.

In operation S3, a frame with respect to a second frequency may be measured.

The second frequency is different from the first frequency. Light that is modulated by the second frequency is emitted from the light source 30 and enters the image sensor 38 through the lens 34 and the optical shutter 36 after being reflected off the object 32. The operation S3 may be a process of measuring an intensity of the light incident to the image sensor 38.

The number of frame measurements with respect to the second frequency may be from one to three. However, when the frequencies used for measuring a distance are three, the number of frame measurements with respect to the second frequency may be two. A total number of frame measurements, that is, the sum of the number of frame measurements with respect to the first frequency and the number of frame measurements with respect to the second frequency for updating the distance information of the object 32 may not exceed four. Accordingly, the number of frame measurements with respect to the first frequency and the number of frame measurements with respect to the second frequency may be determined based on the total number of frame measurements. For exemplary, when the frame measurements with respect to the first frequency are performed three times, the number of frame measurements with respect to the second frequency may be performed once, and vice versa. Also, when the frame measurements with respect to the first frequency are performed twice, the frame measurements with respect to the second frequency may be performed twice.

When three frequencies are used, the total number of frame measurements may be six in order to perform a single update of the distance information.

When the frame measurements with respect to the second frequency are performed twice, light that is measured at the first measurement may be the light emitted at a phase 180° in FIG. 1, and light that is measured at the second measurement may be the light emitted at a phase 270° in FIG. 1. When the frame measurements with respect to the first frequency are performed three times, the frame measurements with respect to the second frequency may be performed once, and at this point, the light measured may be the light emitted at a phase 270° in FIG.

In the process of frame measurements with respect to the second frequency, a frequency equal to the second frequency may be applied to the optical shutter 36 as a driving frequency. At this point, there may be a phase difference of 90° or more between a driving frequency applied to the optical shutter 36 and a driving frequency applied to the light source 30.

In operation S4, a second phase $\varphi_2$ with respect to the second frequency is calculated.

The fourth operation S4 is a process of measuring a phase (the second phase $\varphi_2$) of light incident to the optical shutter 36 when the light modulated by the second frequency is reflected off the object 32 and enters the optical shutter 36. The second phase $\varphi_2$ may be calculated by using the following Equations 1 through 7. In this process, the first phase $\varphi_1$ may be calculated together with the second phase $\varphi_2$. The first phase $\varphi_1$ and the second phase $\varphi_2$ include distance information to the object 32. Accordingly, a distance to the object 32 may be obtained by measuring the first phase $\varphi_1$ and the second phase $\varphi_2$ and using an algorithm (e.g., a computer-implemented program).

Equations 1 through 3 shown below indicate a process of calculating the first phase $\varphi_1$ and the second phase $\varphi_2$ when the frame measurements with respect to the first frequency and the frame measurements with respect to the second frequency are respectively performed twice.

$$I_1 = A\cos\phi_1 + B$$
$$I_2 = A\sin\phi_1 + B$$
$$I_3 = \alpha A\cos\phi_2 + \beta B$$
$$I_4 = \alpha A\sin\phi_2 + \beta B$$
$$\phi_1 = \operatorname{atan}\left(\frac{I_2 - B}{I_1 - B}\right)$$
$$\phi_2 = \operatorname{atan}\left(\frac{I_4 - \beta B}{I_3 - \beta B}\right)$$
$$\phi_2 = \frac{f^1}{f^2}\phi_1$$

[Equation 1]

In Equation 1, $I_1$ and $I_2$ indicate two frames measured with respect to the first frequency in the operation S1. $I_3$ and $I_4$ indicate two frames measured with respect to the second frequency in the operation S3. Parameters f1 and f2 respectively indicate frequencies of the first frequency and the second frequency. B of Equation 1 may be obtained from a quadratic equation with respect to B of Equation 2.

$$(I_1 - B)^2 + (I_2 - B)^2 = A^2$$
$$(I_3 - \beta B)^2 + (I_4 - \beta B)^2 =$$
$$(\alpha A)^2 \Rightarrow \frac{(I_3 - \beta B)^2 + (I_4 - \beta B)^2}{\alpha^2} = A^2$$

[Equation 2]

-continued $$(I_1 - B)^2 + (I_2 - B)^2 = \frac{(I_3 - \beta B)^2 + (I_4 - \beta B)^2}{\alpha^2} \Rightarrow$$

$$2\left(1 - \frac{\beta^2}{\alpha^2}\right)B^2 - 2\left(I_1 + I_2 - \frac{\beta}{\alpha^2}I_3 - \frac{\beta}{\alpha^2}I_4\right)B +$$

$$\left(I_1^2 + I_2^2 - \frac{I_3^2}{\alpha^2} - \frac{I_4^2}{\alpha^2}\right) = 0$$

In Equation 2, when $\alpha$ and $\beta$ are 1, the equation with respect to B may be simplified as Equation 3.

As in the distance measuring method by using a 3D depth sensor according to an exemplary embodiment, when two different frequencies from each other are used for driving the depth sensor 10, an A value and a B value of a signal integrated in the image sensor 38 may become $\alpha A$ and $\beta B$. When a driving voltage of the optical shutter 36 is set in an appropriate ratio according to corresponding frequencies, that is, through an appropriate control of an amplitude and offset when the optical shutter 36 is driven, it may be set as $\alpha=1$ and $\beta=1$. In this case, a computation with respect to B may be simplified as shown in Equation 3. As a result, a distance calculation is simplified.

$$B = \frac{I_1^2 + I_2^2 - I_3^2 - I_4^2}{2(I_1 + I_2 - I_3 - I_4)},$$

$$\phi_1 = \operatorname{atan}\left(\frac{I_2 - B}{I_1 - B}\right), \phi_2 = \operatorname{atan}\left(\frac{I_4 - B}{I_3 - B}\right),$$

[Equation 3]

Equations 4 through 6 shown below indicate a process of calculating the first phase $\varphi_1$ and the second phase $\varphi_2$ when the frame measurements with respect to the first frequency are performed three times and the frame measurement with respect to the second frequency is performed once. In this process, $\alpha$ and $\beta$ are set as $\alpha=1$ and $\beta=1$.

$$I_1 = A\cos(\varphi_1 + \alpha_1) + B$$
$$I_2 = A\cos(\varphi_1 + \alpha_2) + B$$
$$I_3 = A\cos(\varphi_1 + \alpha_3) + B$$
$$I_4 = A\cos\varphi_2 + B$$

[Equation 4]

In Equation 4, $I_1$ through $I_3$ indicate three frames measured with respect to the first frequency in operation S1. $I_4$ indicates one frame measured with respect to the second frequency in operation S3.

A and B in Equation 4 may be obtained by using Equation 5.

$$A = \frac{I_1 - I_2}{(\cos(\phi_1 + \alpha_1) - \cos(\phi_1 + \alpha_2))},$$
$$B = I_1 - A\cos(\phi_1 + \alpha_1),$$

[Equation 5]

The first phase $\varphi_1$ and the second phase $\varphi_2$ may be obtained by using Equations 6 and 7, respectively.

$$\Phi1 = \operatorname{atan}\left[\frac{(I_2 - I_3)\cos\alpha_1 - (I_1 - I_3)\cos\alpha_2 + (I_1 - I_2)\cos\alpha_3}{(I_2 - I_3)\sin\alpha_1 - (I_1 - I_3)\sin\alpha_2 + (I_1 - I_2)\sin\alpha_3}\right]$$

[Equation 6]

$$\alpha_1 = 0, \alpha_2 = 120, \alpha_3 = 240,$$

$$\Phi 2 = \operatorname{acos}\left(\frac{I_4 - B}{A}\right) \quad \text{[Equation 7]}$$

In this manner, when the first phase $\varphi_1$ and the second phase $\varphi_2$ are obtained, a distance to the object 32 is measured based on the first phase $\varphi_1$ (hereinafter, a first measurement) (operation S5) and a distance to the object 32 is measured based on the second phase $\varphi_2$ (hereinafter, a second measurement) (operation S6).

In operation S7, a final distance to the object 32 is calculated and output by using data with respect to the distances obtained from the first and second measurements.

The first and second measurements of operation S6 and the calculation of operation S7 may be performed by using an algorithm (e.g., a computer-implemented program) on a computer-readable recording medium.

The computer-recording medium may be disposed in the depth sensor 10, or alternatively, disposed in another device that may be connected to the depth sensor 10 via wire or wireless communication. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

A maximum measurable distance in this method may be determined by the least common multiple of the maximum distances at each of the used frequencies.

For example, when two frequencies (the first and second frequencies) are used to measure a distance, the maximum measurable distance may be the least common multiple of the maximum distances measured at the first frequency and the second frequency. Accordingly, frequencies to be used may be appropriately combined by taking into account a distance to be measured.

Figure 3:
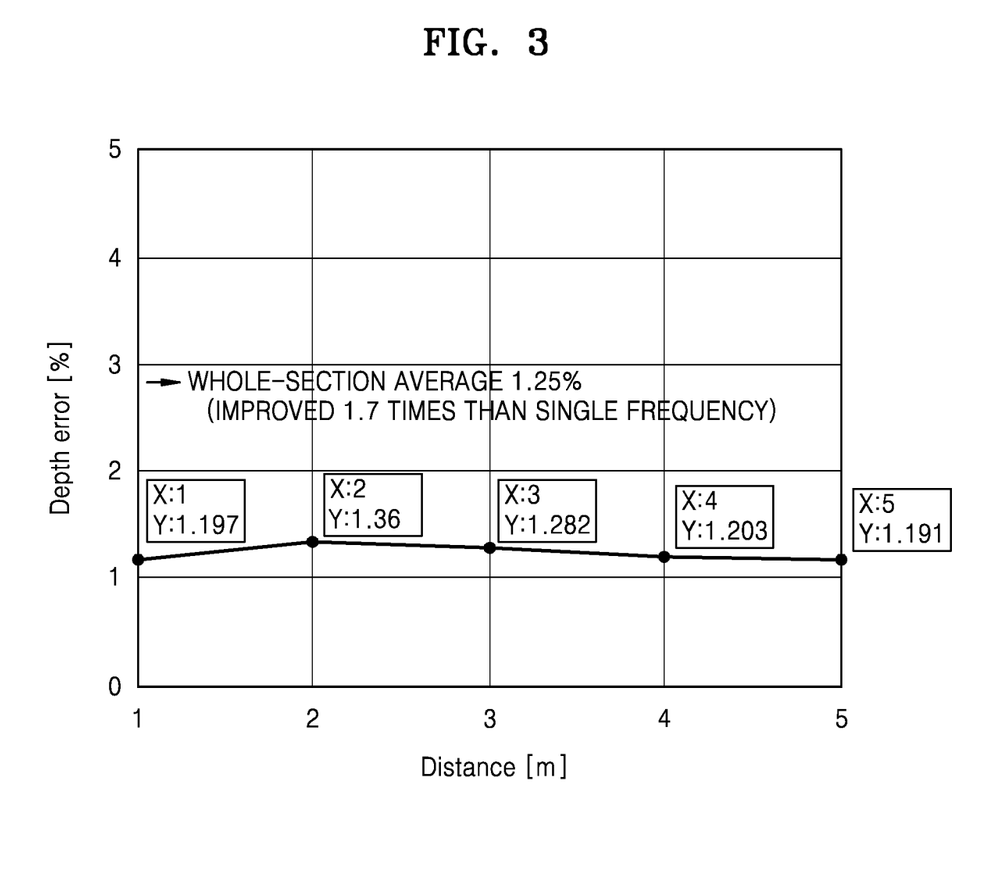
FIG. 3 is a graph showing a result of simulation with respect to distance measurements by using a distance measuring method, according to an exemplary embodiment.

FIG. 3 is a graph showing a result of simulation with respect to distance measurements by using a distance measuring method according to an exemplary embodiment.

In a simulation for obtaining the result of FIG. 3, the first frequency and the second frequency are set as 30 MHz and 40 MHz, respectively and $\alpha$ and $\beta$ are set as $\alpha=1$ and $\beta=1$ in driving of the optical shutter 36.

Figure 4:
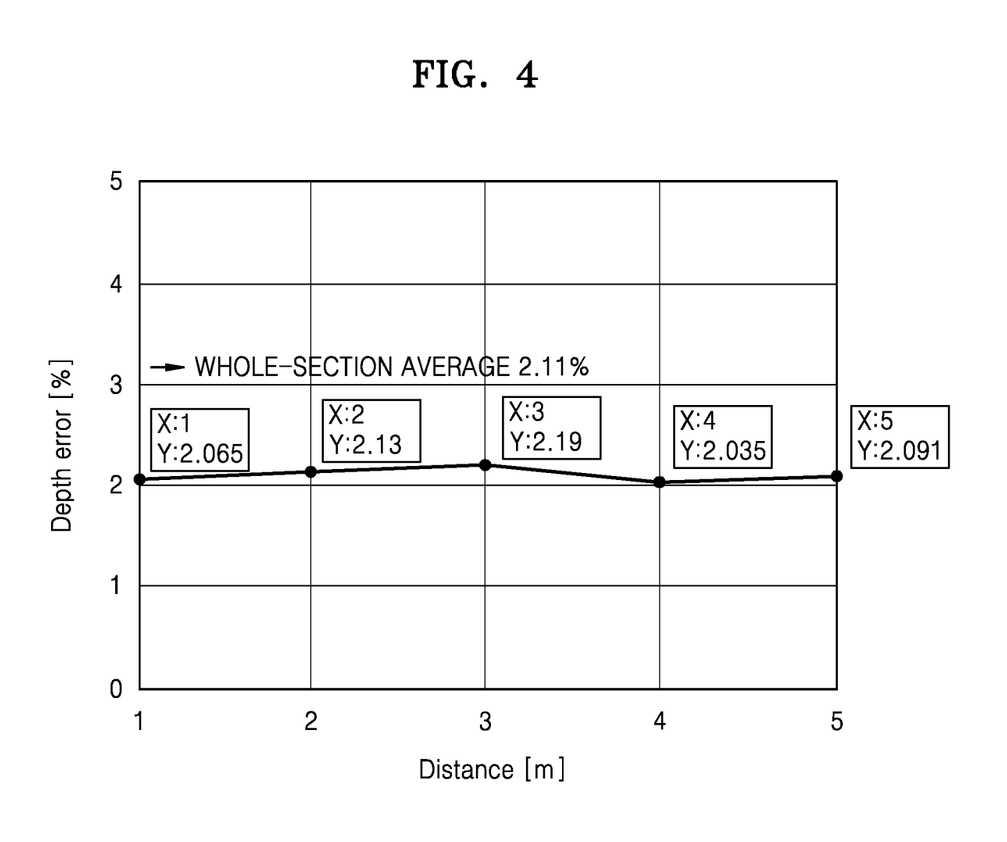
FIG. 4 is a graph showing a result of simulation with respect to distance measurements by using a measuring method that uses a single frequency (20 MHz), according to the related art.

FIG. 4 is a graph showing a result of simulation with respect to distance measurements by using a measuring method that uses a single frequency (20 MHz), according to the related art.

In FIGS. 3 and 4, the horizontal axis indicates a distance to an object and the vertical axis indicates a depth error.

In the method of measuring a distance according to an example embodiment, the depth error is 1.25% as shown in FIG. 3, but in the method of measuring a distance according to the related art, the depth error is 2.11% as shown in FIG. 4. FIGS. 3 and 4 show that, when a distance is measured according to an exemplary embodiment, the depth error may be reduced lower than the depth error of the related art and, the accuracy of distance measurement may be increased.

In the driving of the 3D depth sensor according to an exemplary embodiment, when an optical signal is measured by using a light receiving device, for example, a photodiode, it is possible to confirm that what kinds of frequency component signals are included in the optical signal in what order, that is, that two frames or three frames with respect to the first frequency are measured. Through this confirmation, whether the same computation is used or not may be confirmed.

The method of measuring a distance according to an exemplary embodiment uses two different frequencies from each other. However, the number of frames measured for updating distance information may not exceed more than four frames. Accordingly, the method of measuring a distance according to an exemplary embodiment may increase a measuring distance and the accuracy of distance measurement while the time for updating the distance information is maintained as the same in the case of using a single frequency.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of measuring a distance by using a 3-dimensional (3D) depth sensor, the method comprising:

measuring a first intensity of a first frame and a second intensity of a second frame using light modulated at a first frequency and reflected from an object, wherein the first intensity is represented as a first cosine function having a value A and a value B as an amplitude and a vertical shift of the first cosine function, respectively, and the second intensity is represented as a first sine function having the value A and the value B as an amplitude and a vertical shift of the first sine function, respectively;

measuring a third intensity of a third frame and a fourth intensity of a fourth frame using light that is modulated at a second frequency and reflected from the object, wherein the third intensity is represented as a second cosine function having a proportional value of the value A and a proportional value of the value B as an amplitude and a vertical shift of the second cosine function, respectively, and the fourth intensity is represented as a second sine function having the proportional value of the value A and the proportional value of the value B as an amplitude and a vertical shift of the second sine function, respectively;

obtaining the value B based on the first, and the second, the third, and the fourth intensities;

obtaining a first phase with respect to the light modulated at the first frequency, based on the first and the second intensities and the value B, and obtaining a second phase with respect to the light modulated at the second frequency, based on the third and the fourth intensities and the value B; and determining a distance to the object based on the first phase and the second phase.

2. The method of claim 1, further comprising emitting the light of the first frequency at a 0° phase and a 90° phase, respectively, to measure the first and the second intensities of the first frame and the second frame using the light modulated at the first frequency and reflected from the object.

3. The method of claim 1, wherein the obtaining the value B comprises obtaining the value B based on a following equation:

$$B = \frac{I_1^2 + I_2^2 - I_3^2 - I_4^2}{2(I_1 + I_2 - I_3 - I_4)}$$

wherein $I_1$, $I_2$, $I_3$, and $I_4$ denote the first intensity, the second intensity, the third intensity, and the fourth intensity, respectively.

4. The method of claim 1, wherein the obtaining the first phase comprises obtaining the first phase based on tan $$\left(\frac{I_2 - B}{I_1 - B}\right),$$

wherein $I_1$, $I_2$, $I_3$, and $I_4$ denote the first intensity, the second intensity, the third intensity, and the fourth intensity, respectively.

5. The method of claim 1, wherein the obtaining the second phase comprises obtaining the second phase based on tan $$\left(\frac{I_4 - B}{I_3 - B}\right),$$

wherein $I_1$, $I_2$, $I_3$, and $I_4$ denote the first intensity, the second intensity, the third intensity, and the fourth intensity, respectively.

6. A non-transitory computer readable storage medium storing a program that is executable by a computer to perform a method comprising:
measuring a first intensity of a first frame and a second intensity of a second frame using light that is modulated at a first frequency and reflected from an object, wherein the first intensity is represented as a first cosine function having a value A and a value B as an amplitude and a vertical shift of the first cosine function, respectively, and the second intensity is represented as a first sine function having the value A and the value B as an amplitude and a vertical shift of the first sine function, respectively;
measuring a third intensity of a third frame and a fourth intensity of a fourth frame using light that is modulated at a second frequency and reflected from the object, wherein the third intensity is represented as a second cosine function having a proportional value of the value A and a proportional value of the value B as an amplitude and a vertical shift of the second cosine function, respectively, and the fourth intensity is represented as a second sine function having the proportional value of the value A and the proportional value of the value B as an amplitude and a vertical shift of the second sine function, respectively;
obtaining the value B based on the first, the second, the third, and the fourth intensities;
obtaining a first phase with respect to the light modulated at the first frequency, based on the first and the second intensities and the value B, and obtaining a second phase with respect to the light modulated at the second frequency, based on the third and the fourth intensities and the value B; and
determining a distance to the object based on the first phase and the second phase.

7. The non-transitory computer readable storage medium of claim 6,
wherein the obtaining the value B comprises obtaining the value B based on a following equation:

$$B = \frac{I_1^2 + I_2^2 - I_3^2 - I_4^2}{2(I_1 + I_2 - I_3 - I_4)}$$

wherein $I_1$, $I_2$, $I_3$, and $I_4$ denote the first intensity, the second intensity, the third intensity, and the fourth intensity, respectively;
wherein the obtaining the first phase comprises obtaining the first phase based on tan $$\left(\frac{I_2 - B}{I_1 - B}\right),$$

and
wherein the obtaining the second phase comprises obtaining the second phase based on tan $$\left(\frac{I_4 - B}{I_3 - B}\right).$$

8. A method of measuring a distance by using a 3-dimensional (3D) depth sensor, the method comprising:
measuring a first intensity of a first frame, a second intensity of a second frame, and a third intensity of a third frame using light modulated at a first frequency and reflected from an object, wherein the first intensity is represented as a first cosine function having a first phase difference and having a value A and a value B as an amplitude and a vertical shift of the first cosine function, respectively, and the second intensity is represented as a second cosine function having a second phase difference and having the value A and the value B as an amplitude and a vertical shift of the second cosine function, respectively, and the third intensity is represented as a third cosine function having a third phase difference and having the value A and the value B as an amplitude and a vertical shift of the third cosine function, respectively;
measuring an intensity of a fourth frame using light modulated at a second frequency and reflected from the object;
obtaining the value B based on the first, second, and third intensities, and the intensity of the fourth frame;
obtaining a first phase with respect to the light modulated at the first frequency, based on the intensities of the first frame, the second frame, the third frame, and the value B;
obtaining a second phase with respect to the light modulated at the second frequency, based on the intensity of the fourth frame;
obtaining the value A based on the first and second intensities, the first phase, and the first and second phase differences; and determining a distance to the object based on the first phase and the second phase.

\* \* \* \* \*